Jan. 12, 1926. Re. 16,247
G. H. HANNUM
STEERING MECHANISM FOR MOTOR VEHICLES
Original Filed Oct. 17, 1921
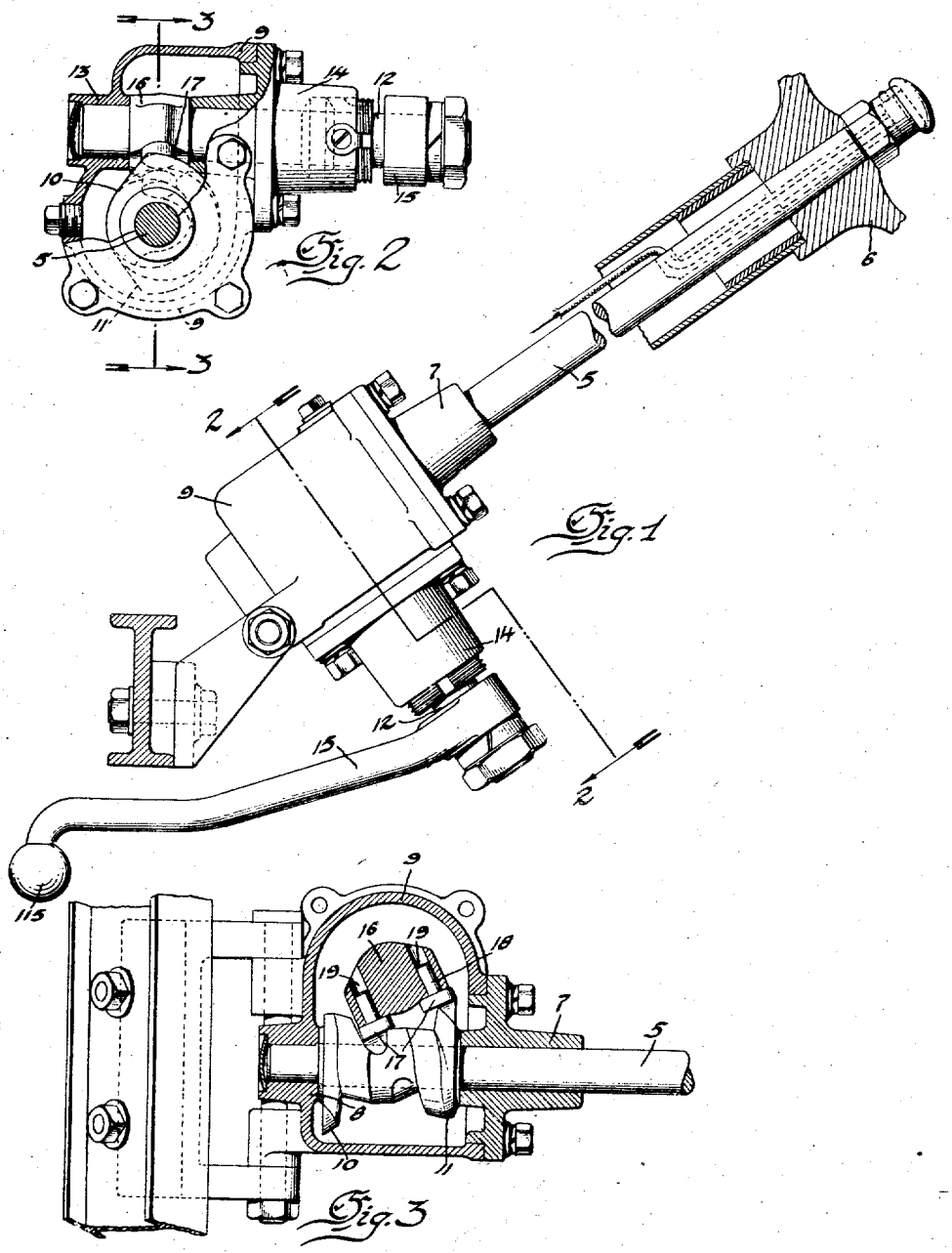
Inventor
George H. Hannum
By his Attorneys
Blackmore, Spencer & Flint Reissued Jan. 12, 1926. Re. 16,247

UNITED STATES PATENT OFFICE.

GEORGE H. HANNUM, OF PONTIAC, MICHIGAN, ASSIGNOR TO GENERAL MOTORS CORPORATION, OF DETROIT, MICHIGAN, A CORPORATION OF DELAWARE.

STEERING MECHANISM FOR MOTOR VEHICLES.

Original No. 1,425,765, dated August 15, 1922, Serial No. 508,282, filed October 17, 1921. Application for reissue filed January 31, 1923. Serial No. 616,208.

*To all whom it may concern:*

Be it known that I, GEORGE H. HANNUM, a citizen of the United States of America, and a resident of Pontiac, county of Oakland, State of Michigan, have invented certain new and useful Improvements in and Relating to Steering Mechanism for Motor Vehicles, of which the following is a full, clear, concise, and exact description, such as will enable others skilled in the art to which the invention relates to make and use the same, reference being made therein to the accompanying drawing, which forms a part of this specification.

My invention relates to steering mechanism for automobiles and similar self-propelled vehicles; and particularly to steering mechanism of the general type or class to which United States patents to H. J. Hert, No. 980,636, January 3, 1911, for steering apparatus for automobiles, and H. Marles, No. 1,189,985, July 4, 1916, for steering gear for mechanically propelled vehicles relate; and wherein motion is communicated from a rotatable steering shaft to the link mechanism through which the front wheels of the vehicle are operated through two cams carried by the steering shaft, and which cams act to impart oscillatory motion to a transverse shaft which carries a steering arm the free end of which is connected with the link mechanism in question.

The principal object of my invention is to provide an improved and simplified form of steering mechanism of the general type or class above referred to which may be readily and cheaply manufactured, which will be effective for the purpose for which it is designed, and which will not be likely to get out of order when in use.

With the above and other objects of invention in view my invention consists in the improved steering mechanism illustrated in the accompanying drawing and hereinafter described and claimed; and in such variations and modifications thereof, within the scope of the concluding claims, as will be obvious to those skilled in the art to which my invention relates.

Referring now to the drawing wherein the preferred embodiment of my invention is illustrated:

Figure 1 is a fragmentary view partly in section and partly in side elevation showing my improved steering mechanism.

Figure 2 is a view broken away in part to better show certain features of internal constructions of my improved steering mechanism, the same being taken substantially upon planes indicated by the broken line 2—2, Figure 1.

Figure 3 is a view showing a section upon a plane indicated by the line 3—3, Figure 2.

Referring to the drawing, the reference numeral 5 designates a rotatable steering shaft having a steering wheel 6 located adjacent its upper end and the lower end of which is supported in suitable bearings 7, 8 provided in a casing member 9, which in turn is supported from the frame of the vehicle in any suitable way.

Located adjacent the lower end of the shaft 5 and within the casing 9 is a cam element consisting of the two oppositely arranged cam members 10, 11; while the reference numeral 12 designates an oscillating shaft supported in bearings 13, 14 also carried by the casing member 9. The bearings 7 and 14 are preferably provided in removable cover plates or heads, as shown, in order to permit the parts to be assembled and disassembled, as will be appreciated. The shaft 12 extends transversely to the steering shaft 5 and has a steering arm 15 at one end thereof, the free end 115 of which arm is connected with the rods or links through which the front wheels of the vehicle are swung from side to side, as is usual in motor vehicle steering mechanism.

Carried by the oscillating shaft 12 and located within the casing 9 is a supporting member 16 which is shown as formed by an enlarged central portion of the said shaft; and this supporting member is provided with bearing means, such as the two separate bearing members 17, 17 which have flat bearing surfaces of as large an area as practicable both of which always contact with the operating peripheral surfaces of the cams 10, 11, as illustrated in Figure 3. The cams illustrated are of the spiral or snail form and are oppositely arranged so that in whatever angular position the shaft 5 is placed both the bearing surfaces 17 will be in contact with the cams, and so that as the shaft 5 is rotated to steer the vehicle motion will be communicated therefrom through the cams to the oscillating shaft 12, and therefrom to the front wheels of the vehicle.

The bearing members 17, 17 are preferably made separate from the supporting member 16 of the transverse shaft and the faces thereof which contact with the cams are of as great an area as practicable, to thereby increase the bearing surface between the cams and the said members; and said members being separate from the supporting member may be made of material well adapted to resist wear, thereby reducing the amount of lost motion which may develop during long use of the device. Said bearing members are preferably in the form of circular discs having their side or flat faces in engagement with the cam members 10 and 11 and having stems 18 which extend into passages 19, 19 provided in the supporting member 16 and arranged at an angle to the contacting face of the cam element; from which it follows that the bearing members are free to rotate upon their axes during the operation of the device, as the action of the peripheral surfaces of the cams upon the bearing members is such as to tend to rotate them slightly upon their axes.

It will be appreciated from the premises that the steering mechanism wherein my invention consists is simple in form and one which may be readily and cheaply manufactured at a minimum of expense; that the form of bearing members is such that they will be subjected to little wear when the device is in use; and that if and when said bearing members become worn to such an extent as to result in objectionable looseness and lost motion in the steering mechanism the head which carries the bearing 14 may be removed, the transverse shaft 12 also removed, and the worn bearing members removed and new bearing members substituted therefor, all at a minimum of trouble and expense.

Having thus described and explained my invention, I claim and desire to secure by Letters Patent:

1. In steering mechanism of the class described, a rotatable steering shaft; two oppositely arranged cam members carried by said shaft, and located adjacent the lower end thereof; an oscillating shaft located adjacent said cams and extending transverse to said steering shaft; a steering arm carried by said oscillating shaft; a supporting member carried by said oscillating shaft; and two bearing members carried by said supporting member and having flat surfaces adapted to contact one with each of the cam members aforesaid and which surfaces lie in a plane which is fixed relative to the axis of said oscillating shaft.

2. In steering mechanism of the class described, a rotatable steering shaft; two oppositely arranged cam members carried by said shaft and located adjacent the lower end thereof; an oscillating shaft located adjacent said cams and extending transverse to said steering shaft; a steering arm carried by said oscillating shaft; a supporting member carried by said oscillating shaft and having two parallel passages spaced apart from one another and located one upon each side of the axis of said shaft; and two bearing members each comprising a disc adapted to contact, respectively, with said cam members, and a shank extending into one of said passages.

3. In steering mechanism of the class described, a rotatable steering shaft; two oppositely arranged cam members carried by said shaft and located adjacent the lower end thereof; an oscillating shaft located adjacent said cams and extending transverse to said steering shaft; a steering arm carried by said oscillating shaft; a supporting member carried by said oscillating shaft; and two freely rotatable bearing members carried by said supporting member and having flat bearing surfaces adapted to contact one with each of the cam members aforesaid, said bearing members being rotatable about axes spaced apart from one another, and which axes extend transverse to said oscillating shaft.

4. In steering mechanism of the class described an oscillating shaft having a supporting member provided with two parallel passages spaced apart and extending transverse to, and located one upon each side of the axis of said shaft; two bearing members carried by said supporting member and having each a flat bearing surface, and a shank extending into one of said passages; and two rotatable cam members disposed adjacent said shaft and with which the bearing surfaces aforesaid contact.

5. In steering mechanism of the class described, a rotatable steering shaft; two oppositely arranged cam members carried by said shaft and located adjacent the lower end thereof; an oscillating shaft located adjacent said cams and extending transverse to said steering shaft; two bearing members carried by said oscillating shaft and having flat surfaces both lying in one and the same plane, and which surfaces are adapted to contact one with each of said cam members; and means whereby oscillating motion of said oscillating shaft is communicated to the wheels of a vehicle to thereby steer the same.

6. In steering mechanism of the class described, a rotatable steering shaft; two oppositely arranged cam members carried by said shaft and located adjacent the lower end thereof; an oscillating shaft located adjacent said cams and extending transverse to said steering shaft at one side of the axis thereof; bearing means carried by said oscillating shaft and having substantially flat portions with which said cam members engage and which portions are arranged substantially parallel with the plane of the axis of said oscillating shaft; and means whereby oscillating motion of said shaft is communicated to the wheels of a vehicle to thereby steer the same.

In testimony whereof I affix my signature.

GEORGE H. HANNUM.